Figure 1:
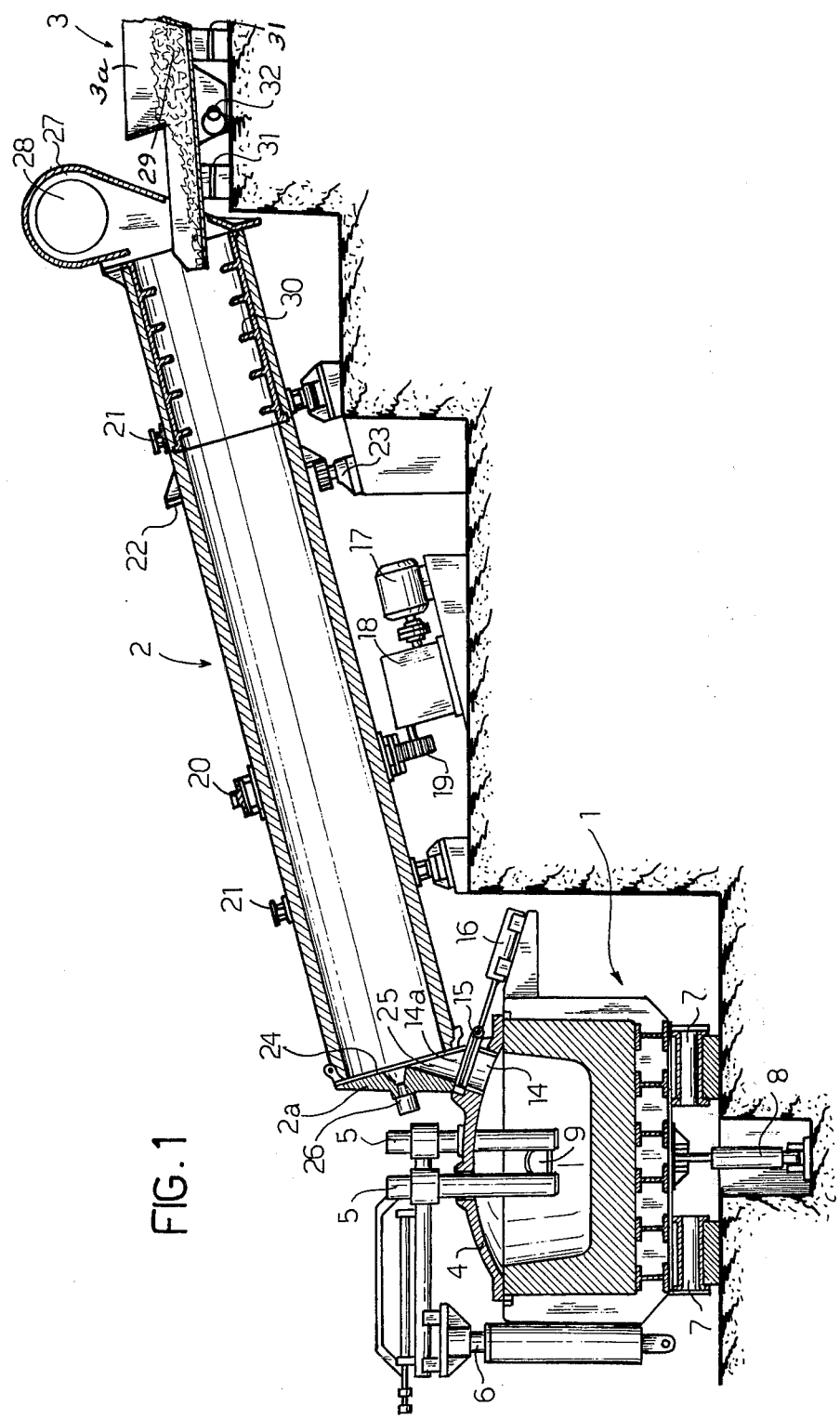

United States Patent [19]

Brusa

[11] 4,002,465
[45] Jan. 11, 1977

[54] PROCESS FOR CONTINUOUSLY HEATING AND MELTING PREREDUCED IRON ORES

[76] Inventor: Ugo Brusa, Via Borgnis, Domodossola, Italy

[22] Filed: Apr. 9, 1975

[21] Appl. No.: 566,393

[30] Foreign Application Priority Data

Apr. 16, 1974 Italy .............................. 68207/74

[52] U.S. Cl. ..................................... 75/11; 75/29; 75/40
[51] Int. Cl.² ........................................ C21C 5/52
[58] Field of Search .......................... 75/11, 29, 40

[56] References Cited

UNITED STATES PATENTS

| | | | |
|---|---|---|---|
| 2,805,930 | 9/1957 | Udy | 75/11 |
| 3,206,299 | 9/1965 | Senior | 75/11 |
| 3,224,871 | 12/1965 | Collin | 75/11 |

Primary Examiner—Peter D. Rosenberg

[57] ABSTRACT

A process for continuously preheating and melting prereduced iron ores, in which a charge is continuously introduced into an electric furnace after having been heated by the flue gases coming from the furnace and by the heat and the flue gases from at least one auxiliary heating device, the heating treatment being effected while the charge is subjected to a combined rotary and translatory motion. The charge may comprise, besides the ore, also scorifying agents and/or solid fuels and/or scrap metal.

2 Claims, 1 Drawing Figure

PROCESS FOR CONTINUOUSLY HEATING AND MELTING PREREDUCED IRON ORES

The present invention relates to a process for continuously preheating and melting prereduced ores in industrial furnaces, more particularly in electric furnaces.

According to known melting processes, the prereduced ore is introduced into the furnaces at ambient temperature, and is then heated to the melting point either by means of an electric arc which is struck and maintained between appropriate electrodes or between the electrodes and the sole of the furnace, or by means of currents induced in the ore itself.

The ore may be introduced in the furnace either within the circle in which the electrodes lie, or outside said circle, or through the furnace door or other secondary side openings. Preferably the ore is introduced into the furnace in a continuous way, for instance by means of a conveyor belt or a tubular introduction device, since the continuous charging ensures better melting conditions.

This process has the disadvantage of being very expensive, first of all because the electric energy is used not only to melt the ore, but also to heat it and, what is more, in ambients where considerable thermic losses occur through the openings which allow the introduction of the ore.

Moreover the prereduced ore, due to its porosity and its nonferrous contents, requires a very high specific consumption of energy, so that, in order to obtain not too long melting times, notwithstanding the better melting conditions ensured by the continuous charging, it is necessary to employ transformers providing the current for the furnace having a very high power, which transformers are expensive in se and require moreover a high consumption of electric energy.

The presence of these high power transformers is made necessary also by the need to have a good productive capacity, since the charging speed of the material must be adapted to the melting power of the furnace.

Further it is to be noted that all the electric energy required for the operation of plants employing these known processes may not always be available.

Always according to the known technique, in order to obviate the aforesaid drawbacks, the attempt has been made to subject the prereduced ore to a previous heating effected by non electric means. These attempts were suggested by the ascertainement that, in installations for melting scrap iron and/or steel which employed melting processes substantially corresponding to the aforesaid processes, an economy of electric energy and a decrease of the melting time were obtained if the scrap was introduced in the furnace after having been subjected to a preheating.

This way of proceeding however proved to be inadvisable when prereduced ore is treated, because substantial economies could be achieved only by heating the ore to several hundreds degrees centigrade, and at such temperature difficult problems would have to be faced in relation with the maintaining of the reduced condition of the ore during the conveyance from the heating installation to the melting furnace, that is in order to prevent the ore from becoming again oxidized before its dipping in the melting bath. The unique solution which seemed to give practical results was to carry sheltered from the atmosphere the still hot prereduced ore coming out from the reduction installation, until the steel-plant, and to charge it in the furnace. This procedure required however that the reduction installation and the steel-plant were located in the very proximity of each other.

In order to solve the same problem attempts were also made to introduce the preheated ore in discrete quantities instead of in a continuous way, for instance by employing basket charging systems or the like, but the drawbacks due to the discrete charging used in place of the continuous charging practically annulled the advantages provided by the preheating.

In order to obviate the disadvantages of the known technique the Applicant has conceived a process for continuously melting prereduced iron ores, wherein the electric energy is employed only for melting the ore, the proximity of the installation for the direct reduction to the melting installation is not required, and the reoxidization of the ore is substantially prevented.

The process according to the invention is characterized in that a charge, partly or wholly consisting of prereduced iron ore, is introduced in a continuous way into the melting basin, to be melted by electric energy, after having been heated by the flue gases coming out therefrom, and by the heat and the flue gases generated by at least one auxiliary heating device, and in that the said heating treatment is imparted to the charge while it is subjected to a combined rotary and translatory movement within a refractory cylinder rotatable about its axis and inclined with respect to the horizontal plane, the lower end of the said cylinder communicating with the basin through a channel realized in the crown thereof.

The rotation of the preheating and charging cylinder causes the position of the charged ore therewithin continuously to change, so that, due to the convection motions of the flue gases coming from the basin, the action of the auxiliary heating means, and the irradiation from the cylinder walls, the charge is uniformly heated before being introduced into the melting basin.

The charge introduced into the heating cylinder may comprise only prereduced iron ore. In carrying out the process according to the invention however it has been found advantageous that the charge comprises also a small quantity of scorifying agents and/or of solid fuels. A suitable proportioning of the solid fuel may assist in maintaining a reducing atmosphere within the cylinder and the heat developed by the combustion may assist in heating the charge of ore.

If desired, the charge may comprise also scrap metal.

According to an advantageous feature of the invention, the motion of the charge is slowed down in the upper portion of the rotating cylinder, for instance by means which oppose the free drop of the charge. This slowing down also cooperates in achieving a greater heating uniformity.

According to yet another advantageous feature of the invention, the action of the said auxiliary heating device is exerted mainly in the end portion of the path of the charge within the preheating cylinder.

The use of auxiliary heating devices which exert their action also in other portions of the charge path is however not excluded.

A further feature of the invention is that the charge already passed into the melting basin receives a rotary motion about a vertical axis. This rotary motion assists in achieving a uniform distribution of the charge within the melting basin, thereby avoiding accumulations of material which would slow the melting process and lead to a reoxidization of the material.

The invention will be more clearly understood from the following description of an installation for melting prereduced ore in which the process according to the invention is carried out. This installation is shown in a part sectional side view in the accompanying drawing.

As shown in the drawing, an installation for melting prereduced ore essentially comprises a melting basin or crucible 1, a heater 2 and a device 3 for introducing into the heater the charge 29, consisting mainly of preduced ore with possible additions of scorifying agents and/or solid fuel and/or also metal charges, such as for instance scrap iron and steel.

The crucible 1 substantially comprises an electric arc furnace or an electric induction furnace. In the drawing an arc furnace is shown which is formed with a crown 4 through which extend the electrodes 5 connected to devices 6 of well known type which allow to lift and lower the electrodes. The crucible 1 is hinged adjacent its lower part about a horizontal axis 7, about which it may be oscillated in either direction by a jack 8, when the evacuation of the slag and/or the casting of the molten metal have to be performed through openings formed in the basin walls parallel to the axis 7. In the drawing only the opening 9 for the casting of the molten metal is shown.

Advantageously the crucible 1 may also be mounted rotatable about a vertical axis, so as uniformly to distribute the ore within the basin.

Formed in the crown 4 of the crucible 1 there is a substantially vertical channel 14 serving for the introduction of the preheated ore, which channel is connected to another channel 14a formed in the lower end part 2a of the heater. The two channels are separated by a slidable lock 15 which is actuated for instance by a hydraulic or pneumatic jack 16 and allows, in open position, the passage of the preheated ore into the basin 1 and the passage into the heater 2 of the flue gases generated by the melting.

The heater 2 comprises a cylinder or drum of refractory material, the axis of said cylinder being inclined with respect to the horizontal plane. Said cylinder is mounted on suitable supports 21 so as to be rotatable about its axis, and is provided with a thrust device, formed by the gears 22, 23, which prevents the cylinder from sliding downwards while allowing its rotation. Advantageously the rotation of the cylinder may be obtained by means of a motor 17, which, through a reduction gear 18, drives a pinion 19 meshing with a gear 20 coaxial with the cylinder and formed integrally with the outer surface thereof.

The lower end part 2a of the cylinder 2 is solid with the crown 4 of the crucible 1, and is separated from the remaining part of the cylinder 2 by a lock 24 which is provided with an opening 25 for the passage of the heated ore, the center of which is spaced from the axis of the cylinder.

At least in this lower part 2a a burner 26 is mounted which provides directly or through its flue gases the heating of the ore, cooperating with the flue gases coming out from the basin. Further burners may, if it is desired, be mounted within the cylinder.

These burners have also the function to contribute in maintaining a reducing atmosphere within the cylinder 2 in order to prevent the reoxidization of the ore.

The upper part of the cylinder 2 is closed by a hood 27 with a chimney 28 which serves to collect and evacuate the flue gases and is provided with an opening for the introduction of the charge 29. Moreover, in order to limit the initial velocity with which the charge drops towards the bottom of cylinder 2, ribs 30 are realized in this upper part and project towards the interior of the cylinder.

The introduction of the charge 29 into the heater 2 may be effected by means of a conveyor belt, or, as it is shown in the drawings, by means of a hopper 3, comprising a reservoir 3a and a spout 3b projecting into the cylinder, the hopper being mounted at its lower part on resilient supports 31 on which it may be oscillated by a cam device 32.

In an installation such as that above described, the melting process is carried out in the following way:

The ore is introduced at ambient temperature into the cylinder 2 by means of the oscillating hopper 3, and slides towards the lower part of the cylinder by initially moving along the chamber provided with the ribs 30 which slow down the drop of the charge. In this upper part the heating is obtained by means of the flue gases generated by the burner 26 and of the flue gases coming from the melting basin 1, as well as by means of the irradiation from the refractory walls of the cylinder, whereas in the lower part of the said cylinder the heating is mainly effected by the direct action of the burner 26. The duration of the charge travel within the cylinder 2 must be such as to allow a sufficiently strong heating of the charge, while preventing however a reoxidization of the ore. To this end a reducing atmosphere is maintained in the cylinder 2, by introducing together with the ore also solid fuels which, during the heating of the ore, burn generating reducing gases. The uniform heating is ensured by the rotation of cylinder 2, which causes the position of the charge continuously to change.

The heated ore is discharged from cylinder 2 through the offset opening 25 due to the rotation of the cylinder, and then it passes through the channels 14 and 14a into the basin 1 where it is molten electrically. The basin may already contain a bath of molten metal which cooperates in increasing the temperature of the ore and in achieving a uniform distribution of the ore in the basin, when this basin is slowly rotated about a vertical axis. When the melting has been performed, the evacuation of the slag and the casting of the melted metal are performed, taking care of maintaining in the crucible a certain quantity of bath which cooperates in priming the subsequent melting cycle.

An installation such as that above described allows to treat a mass of heated ore of about 50–60 Kgs/min/-Megawatt of furnace power. The value of these results will be better appreciated from a comparison with known continuous melting processes, wherein the ore is introduced in the melting furnace at ambient temperature and in which the maximum treatment capacity is of about 25 – 30 Kgs/min/Megawatt of furnace power.

What is claimed is:

1. Process for continuously preheating and melting at least substantially pre-reduced iron ores, which comprises in combination:
   a. continuously introducing at least substantially pre-reduced iron ore into a rotary, inclined heating zone at the upper end thereof;
   b. rotationally moving said ore from said upper end of said heating zone to the lower end thereof;

c. discharging said ore from said lower end of said heating zone into a melting zone abuttingly juxtapositioned with said lower end;
d. introducing hot flue gases from said melting zone into said lower end to heat in a reduced atmosphere said pre-reduced ore countercurrently to its movement;
e. additionally heating said hot flue gases at said lower end by an auxiliary heating means to increase the heat delivered to said heating zone;
f. lowering the rate of travel of said ore in said heating zone by means of a plurality of ribs positioned in the upper portion of said heating zone, whereby the residence time of said ore in said heating zone is increased; and
g. discharging from said melting zone at predetermined intervals a portion of the ore melted therein, thus leaving in the said melting zone a predetermined amount of molten ore to form a bath onto which said pre-heated ore is discharged.

2. The process according to claim 1, wherein the said melting zone is subjected to a slow, rotary, motion about its vertical axis, thus increasing the uniformity of melting of said pre-heated ore in said melting zone.

* * * * *